United States Patent [19]

Yamane et al.

[11] Patent Number: 5,026,981
[45] Date of Patent: Jun. 25, 1991

[54] SERVO CONTROL GAIN ADJUSTMENT FOR AN OPTICAL DISK APPARATUS

[75] Inventors: Daiji Yamane, Tenri; Noriaki Sakamoto, Kyoto; Nobuyuki Horie, Tenri, all of Japan

[73] Assignee: Sharp Kabushiki Kaisha, Osaka, Japan

[21] Appl. No.: 444,970

[22] Filed: Dec. 4, 1989

[30] Foreign Application Priority Data

Dec. 7, 1988 [JP] Japan .................................. 63-310959

[51] Int. Cl.$^5$ .......................... H01J 40/14; G11B 3/90
[52] U.S. Cl. .............................. 250/214 B; 250/222.1; 250/201.5; 369/44.29; 369/54
[58] Field of Search ............... 369/44.27, 44.29, 44.35, 369/44.36, 44.41, 44.34, 44.25, 44.11, 54, 116, 233, 58; 250/214 B, 214 AL, 214 AG, 201.5, 221, 222.1, 561

[56] References Cited

U.S. PATENT DOCUMENTS

| | | | |
|---|---|---|---|
| 4,580,255 | 4/1986 | Inoue et al. | 369/44.29 |
| 4,587,644 | 5/1986 | Fujiie | 369/44.25 |
| 4,680,744 | 7/1987 | Kanamaru | 369/44.29 |
| 4,701,603 | 10/1987 | Dakin et al. | 250/214 AG |
| 4,723,234 | 2/1988 | Katsuyama et al. | 369/44.29 |
| 4,878,211 | 10/1989 | Suzuki et al. | 369/44.35 |
| 4,899,327 | 2/1990 | Bates et al. | 369/44.35 |
| 4,942,564 | 7/1990 | Hofer et al. | 369/44.11 |

Primary Examiner—David C. Nelms
Assistant Examiner—Michael Messinger

[57] ABSTRACT

An optical disk apparatus comprises a light emission detection circuit which converts a light emission from a light source into an electric signal and releases it as a light emission signal, a photo detector which releases an output signal upon reception of a reflected light from a disk and/or stray lights, a correction signal generating circut which adjusts a prescribed gain in accordance with the amount of stray light, and generates a correction signal by attenuating the light emission signal based on this gain, a subtracter in which the correction signal is subtracted from the output signal of the photo detector, and disk discharging means for discharging the disk from the optical disk apparatus, when the disk is present in the optical disk apparatus during the adjustment of the above-mentioned gain. The optical disk apparatus is arranged such that an optimum gain may be obtained even when the disk is present inside the optical disk apparatus, since the disk is discharged from the optical disk apparatus by the disk discharging means during the adjustment of the gain. Thereby an accurate tracking error signal and focus error signal may be otained by correcting the output signal of the photo detector.

7 Claims, 4 Drawing Sheets

SERVO CONTROL GAIN ADJUSTMENT FOR AN OPTICAL DISK APPARATUS

FIELD OF THE INVENTION

The present invention relates to an optical disk apparatus arranged so as to eliminate from the output signal of a photo detector the error generated by stray light, and to correct this output signal into an optimum output signal.

BACKGROUND OF THE INVENTION

In an optical disk apparatus, light emitted from a light source, after being irradiated on a disk, is led into a photodetector and converted by this photo detector into a reproduction signal, a tracking error signal for leading the light spot in a proper track, and a focus error signal for focusing the light spot in a proper position.

However, a portion of the light emitted from the light source is reflected by the optical system inside the optical pickup, by the holders sustaining this optical system and other components of the system. This portion of light thus becomes stray lights having no relation to light used with the recording and the reproduction of information.

Since the light intensity distribution of these stray lights is irregular, the photodetector cannot produce an accurate tracking error signal and focus error signal when receiving these stray lights.

Hence, conventional optical disk apparatus assume to that the amount of stray light is almost proportional to the light emission of the light source, and and compensate for error due to stray lights by subtracting a correction signal generated based on the light emission from the output signal of the photodetector,.

Such an optical disk apparatus is provided, for example as shown in FIG. 4, with servo signal correction means 21.

In the servo signal correction means 21, a photodetector 22 receives reflected light from a disk, not shown, and releases servo signals for generating a tracking error signal and a focus error signal, as well as, if stray lights are received, an error signal which becomes an error of the servo signals.

On, a light emission signal, which corresponds to the light emission of a light source, not shown, is released by a light emission detection circuit 24, and is attenuated based on a prescribed gain by a correction signal generating circuit 23 which then releases a resultant correction signal.

The correction signal is subtracted in a subtracter 25 from the above-mentioned error signal, which is then released as a corrected error signal. Thereafter, this corrected error signal is converted into a detection signal in a corrected error signal detection circuit 26, and is supplied to the correction signal generating circuit 23.

In the correction signal generating circuit 23, the gain is adjusted according to the above-mentioned detection signal from the light emission detection circuit 24, and the light emission signal is attenuated based on this adjusted gain. Thus a correction signal is generated again. The gain is adjusted likewise repeatedly, and the value of the gain at the time the corrected error signal equals 0, is held.

At time of the recording or reproducing information, a correction signal generated based on the gain adjusted in the above-described manner, is subtracted from each of the servo signals in the subtracter 25. Then, resultant signals are released as corrected servo signals and converted into a tracking error signal and a focus error signal.

In the conventional optical disk apparatus described above, gain is adjusted while a disk is installed in the apparatus. The photodetector 22 only receives reflected light from the disk. Therefore, the photodetector 22 is unable to produce an error signal compensating for the stray lights, and the adjustment of the gain in accordance with the error signal for stray lights can not be effectuated in the correction signal generating circuit 23.

Further, since described above, as an optimum gain can not be obtained, the conventional optical disk apparatus can effectively correct the servo signals.

SUMMARY OF THE INVENTION

The object of the present invention is to provide an optical disk apparatus for producing be an accurate tracking error signal and focus error signal, in which the error due to stray lights has been eliminated by discharging the disk when the gain is adjusted.

In order to achieve the above object, the optical disk apparatus in accordance with the present invention is characterized by comprising:

a light emission detection circuit for converting the light emission of a light source into an electric signal and releases it as a light emission signal;

a photodetector for releasing a signal upon reception of a reflected light from a disk and/or stray lights having no relation with the recording and the reproduction of information;

a correction signal generating circuit for adjusting a prescribed gain according to the amount of stray light, and for generating a correction signal by attenuating the light emission signal based on this adjusted gain;

a subtracter for subtracting the correction signal is from the output signal of the photodetector; and disk discharging means for discharging the disk from the optical disk apparatus when the disk is present inside the optical disk apparatus when the above-mentioned gain is adjusted, composed of for example a control means, disk sensing means and disk tray driving means.

According to the arrangement presented above, the disk is discharged from the optical disk apparatus by the disk discharging means, when the disk is present inside the optical disk apparatus during the adjustment of the gain of the correction signal generating circuit. Thus, the photodetector does not receive any reflected light from the disk.

Accordingly, when the photodetector releases a signal upon reception of the stray lights only, the light emission signal from the light emission detection circuit is attenuated based on the prescribed gain in the correction signal generating circuit, and a correction signal is generated. The above-mentioned correction signal is subtracted from the output signal of the photodetector in the subtracter, and the above-mentioned gain is adjusted according to the resultant signal released. The gain is adjusted in such a manner until the signal released by the subtracter almost equals 0.

Thereafter, during recording or reproducing information, a correction signal is generated in the correction signal generating circuit based on the adjusted gain. Then, by subtracting the correction signal from the output signal of the photodetector in the subtracter, corrected servo signals may be obtained for generating an accurate tracking error signal and focus error signal, in which any error due to the stray lights has been eliminated.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram illustrating the arrangement of the disk discharging means.

FIG. 2 is a block diagram illustrating the arrangement of the servo signal correction means.

FIG. 3 is a flow chart illustrating the control procedure of the disk discharging means.

DETAILED DESCRIPTION OF THE EMBODIMENT

Figure 1:
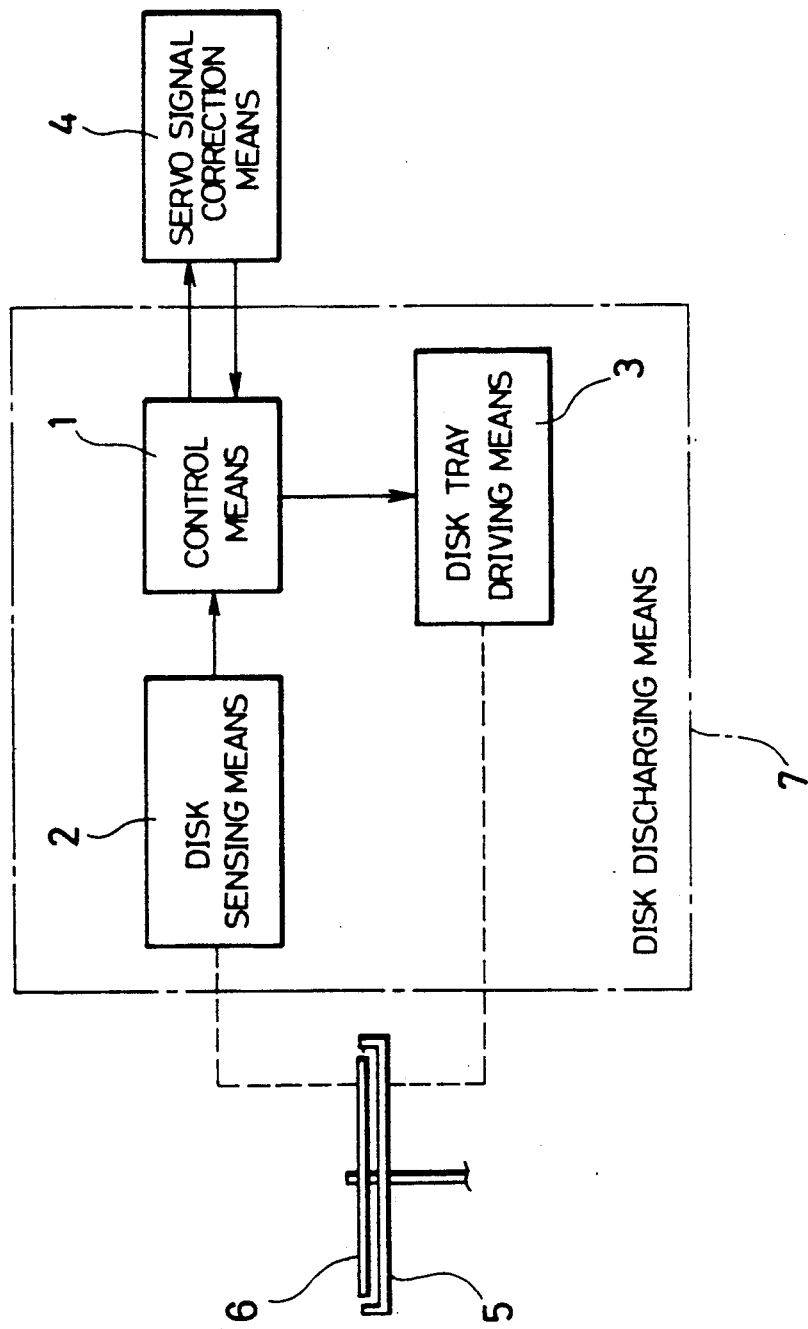
FIG. 1 to FIG. 3 show an embodiment of the present invention.
Figure 2:
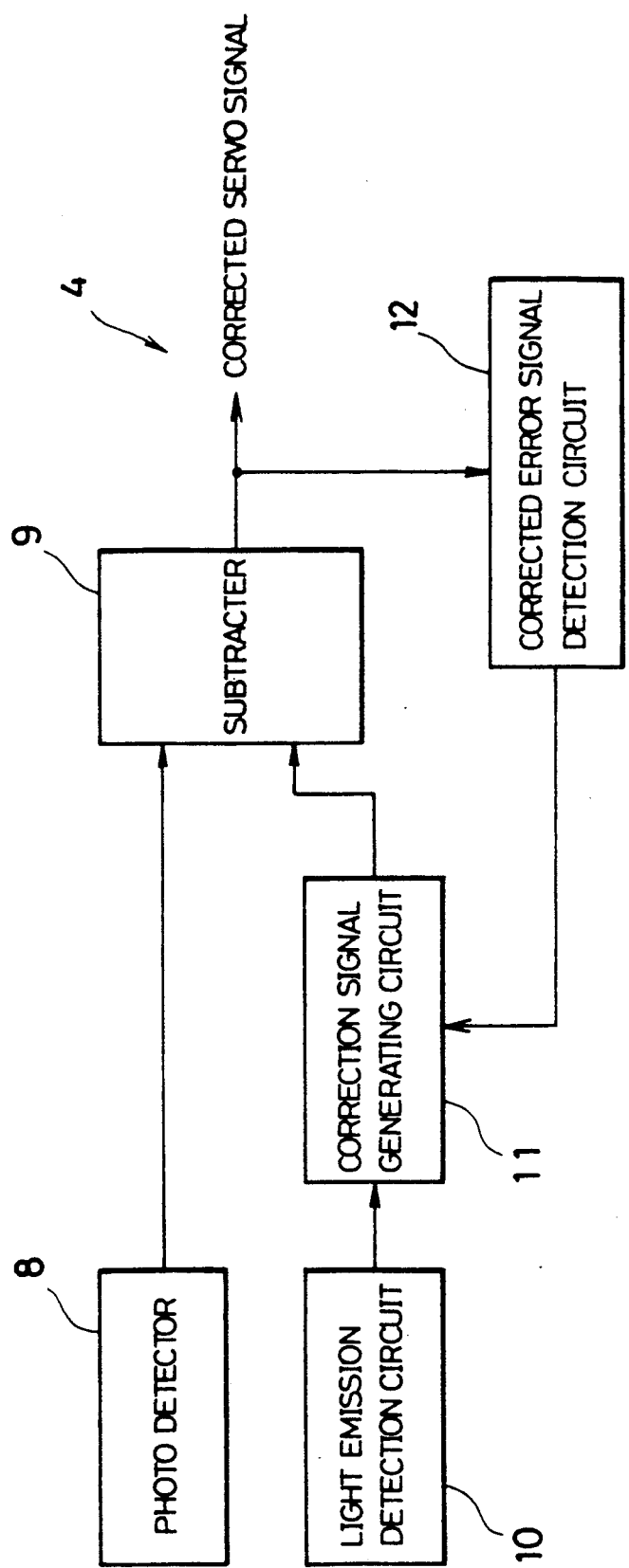
Figure 3:
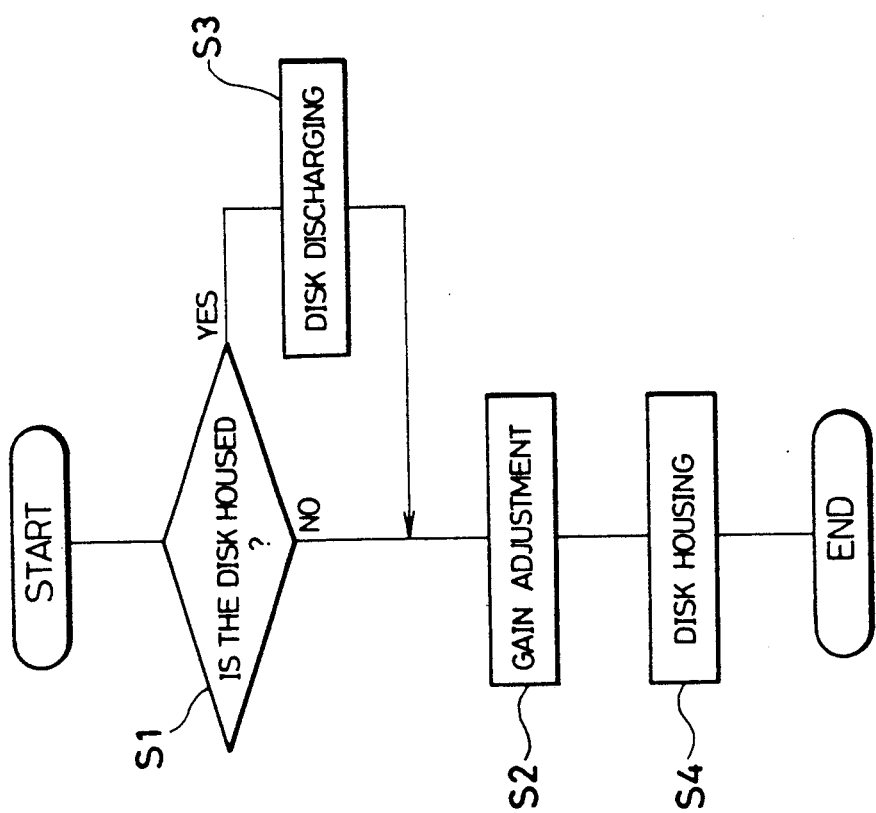
Figure 4:
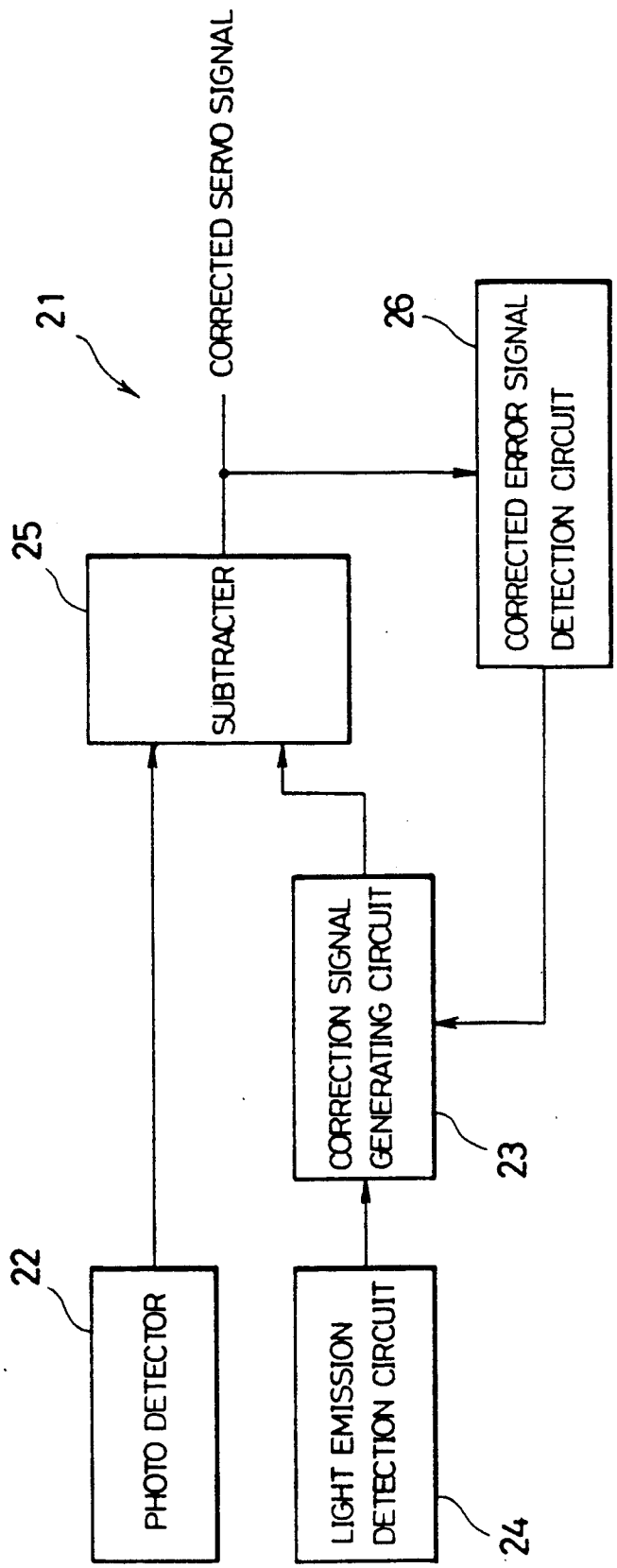
FIG. 4 is a block diagram illustrating the arrangement of the servo signal correction means in a conventional optical disk apparatus.

The following description will discuss an embodiment of the present invention with reference to FIG. 1 to FIG. 3.

As shown in FIG. 1, control means 1 is connected with disk sensing means 2, disk tray driving means 3 and servo signal correction means 4.

When the presence of a disk 6 is sensed by the disk sensing means 2 during the adjustment of the gain in a correction signal generating circuit 11 (explained below), the control means 1 sends a signal to the disk tray driving means 3 to discharge the disk 6 by driving a disk tray 5. When the disk 6 is discharged and the presence of the disk 6 is not sensed any more, the control means 1 controls the servo signal correction means 4 so that the above-mentioned adjustment of the gain is executed.

Further, the control means 1 sends a signal to the disk tray driving means 3 to house the disk 6 by driving the disks tray 5, when the gain adjustment has been completed.

These control procedures are executed automatically in accordance with a control program.

The disk sensing means 2 is meant to sense the presence or absence of the disk 6, and senses by reading control signals recorded on the disk 6.

The disk tray driving means 3 includes of a motor, and a sending device arranged so as to discharge and house the disk 6 by driving the disk tray 5.

The control means 1, the disk sensing means 2 and the disk tray driving means 3 compose the disk discharging means 7, as described above.

The servo signal correction means 4 effectuates correction of the servo signal by eliminating error signals generated due to stray lights, from the signals, among released by a photodetector 8 shown in FIG. 2, which are ultimately converted into a tracking error signal and a focus error signal.

The servo signal correction means 4 will be described in more detail with reference to FIG. 2.

In the servo signal correction means 4, the photodetector 8 is connected to one of the input sides of a subtracter 9, and a light emission detection circuit 10 is connected through a correction signal generating circuit 11 to another input side of the subtracter 9. The output side of the subtracter 9 is connected to the correction signal generating circuit 11 through a corrected error signal detection circuit 12.

The photodetector 8 is a light receiving element which converts light into an electric signal, and is arranged so as to release a signal upon reception of a reflected light from the disk 6. The photodetector 8 also receives, beside in addition to the reflected light from the disk 6 shown in FIG. 1, stray light generated inside the optical pickup, (not shown), and releases a signal of an amplitude corresponding to the amount of stray light (hereinafter referred to as error signal). In appearance, this error signal is comprised in a portion of each of the servo signals.

The subtracter 9 is a circuit in which a correction signal generated by the correction signal generating circuit 11, are subtracted from the output signal of the photodetector 8.

The light emission detection circuit 10 is a circuit which for receiving the light emitted from a light source, not shown, through a light receiving element formed of a photodiode and converting this light into an a light emission signal.

The correction signal generating circuit 11 is a circuit for adjusting the gain according to a detection signal sent from the corrected error signal detection circuit 12, and for generating the correction signal by attenuating the light emission signal of the light emission detection circuit 10 based on this adjusted gain.

In the subtracter 9, the correction signal generated in the correction signal generating circuit 11 is subtracted from the error signal of the photodetector 8, and a signal is released. The corrected error signal detection circuit 12 is a circuit which detects as the corrected error signal as released from the subtracter 9, and releases the detection signal according to this signal.

In the arrangement mentioned above, the gain of the correction signal generating circuit 11 is adjusted to a value corresponding to the amount of stray light so that the correction of the servo signals may be carried out by the servo signal correction means 4.

Preceding adjustment of the gain, the disk tray driving means 3 discharges the disk 6 by driving the disk tray 5, when the disk 6 is sensed by the disk sensing means 2.

After the disk 6 is discharged, gain adjustment of the is effectuated. At this time, as there is no reflected light from the disk 6 anymore, the photodetector 8 releases an error signal based upon reception of the stray lights only.

On the other hand, the correction signal generating circuit 11 attenuates the light emission signal from the light emission detection circuit 10 based on a prescribed gain, and generates the correction signal. The above-mentioned correction signal is subtracted in the subtracter 9 from the error signal mentioned earlier, which is then released as a corrected error signal.

This corrected error signal is converted into the detection signal in the corrected error signal detection circuit 12, and is released. In the correction signal generating circuit 11, the gain is adjusted in accordance with the detection signal released by the corrected error signal detection circuit 12, and a correction signal of an amplitude corresponding to the error signal is generated based on this gain. For example, when the value of the above-mentioned detection signal is positive, the gain is adjusted so as to increase the correction signal, and when the value of the detection signal is negative, the gain is adjusted so as to reduce the correction signal.

Such adjustment of the gain is repeated until the corrected error signal equals 0. The correction signal generating circuit 11 holds the gain obtained when the corrected error signal equals 0, and the adjustment of the gain is ended.

When the adjustment of the gain is ended, the disk tray driving means 3 drives the disk tray 5 and houses the disk 6. When the recording or the reproduction is effectuated in this state, a correction signal based on the gain adjusted in the above-mentioned manner, is generated in the correction signal generating circuit 11. Then, in the subtracter 9 the above-mentioned correction signal is subtracted from each of the servo signals released from the photo detector 8. The result of this subtraction is released as corrected servo signals which are then converted into a tracking error signal and a focus error signal.

The following will describe the control procedure of the disk discharging means 7 with reference to FIG. 3.

It is determined by the disk sensing means 2 whether or not the disk 6 is housed (S1). When it is determined that the disk 6 is not housed, the adjustment of the gain in the correction signal generating circuit 11 is carried out (S2). When it is determined in S1 that the disk 6 is housed, the disk tray 5 is driven by the disk tray driving means 3 and the disk 6 is discharged (S3). In S2, when the gain adjustment is ended, the disk tray 5 is driven by the disk tray driving means 3 and the disk 6 is housed (S4).

The optical disk apparatus in accordance with the present invention is characterized, as described above, in comprising disk discharging means for discharging the disk from the optical disk apparatus when the disk is present inside the optical disk apparatus during the adjustment of the prescribed gain according to the amount of stray light in the correction signal generating means.

Consequently, during the adjustment of the gain in the correction signal generating circuit, since the disk discharging means discharges the disk from the optical disk apparatus, the photo detector releases a signal upon reception of the stray lights only. Thereby, a gain corresponding to the amount of stray light may be obtained.

When effectuating the recording or the reproduction, a correction signal generated based on the above-mentioned gain is subtracted from the output signal of the photo detector in the subtracter. Thus, the error due to the stray lights may be eliminated accurately.

Accordingly, the correction of the output signal from the photo detector may be carried out even when the disk is present inside the optical disk apparatus, and an accurate tracking error signal and focus error signal may be obtained.

The invention being thus described, it may be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. An optical disk apparatus comprising:
   a light emission detection circuit which receives a light emitted from a light source, converts said light into an electric signal and releases said electric signal as a light emission signal;
   a photo detector which releases a signal upon reception of a reflected light from a disk and/or stray lights;
   a correction signal generating circuit which adjusts a prescribed gain in accordance with the amount of said stray light, generates a correction signal by attenuating said light emission signal based on said gain;
   a subtracter in which said correction signal is subtracted from the output signal of said photo detector; and
   disk discharging means for discharging said disk from the optical disk apparatus when said disk is present inside the optical disk apparatus during the adjustment of said gain.

2. The optical disk apparatus as defined in claim 1, wherein said disk discharging means is composed of:
   disk sensing means for sensing the presence or absence of said disk;
   disk tray driving means for discharging said disk by driving a disk tray; and
   control means connected to servo signal correction means, and for controlling the disk tray driving means in order to discharge said disk when the presence of said disk is sensed during the adjustment of said gain in said correction signal generating circuit.

3. The optical disk apparatus as defined in claim 2 wherein the disk tray driving means comprises a motor, a sending device and the like.

4. The optical disk apparatus as defined in claim 2 wherein the servo signal correction means is composed of:
   said photo detector which releases an error signal upon reception of said stray lights generated inside the optical pickup;
   said light emission detection circuit;
   said correction signal generating circuit;
   said subtracter; and
   a corrected error signal detection circuit which detects as a corrected error signal, a signal released as the result of the subtraction of said correction signal from the error signal, and which releases a detection signal corresponding to the corrected error signal.

5. The optical disk apparatus as defined in claim 3 wherein said light emission detection circuit comprises a light receiving element formed of photodiode for monitoring the intensity of said light.

6. A method for adjusting gain in an optical disk apparatus, the steps comprising:
   determining through disk sensing means whether said disk is housed;
   adjusting a gain in a correction signal generating circuit, when it is determined that said disk is not housed;
   discharging said disk by driving a disk tray through a disk tray driving means, when it is determined that said disk is housed;
   housing said disk by driving said disk tray;
   generating a correction signal by attenuating a light emission signal based on a prescribed gain;
   subtracting said correction signal from an error signal in a subtracter and releasing a corrected error signal;

converting said corrected error signal into a detection signal in a corrected error signal detection circuit;

adjusting said gain according to said detection signal in a correction signal generating circuit, and generating a correction signal based on this gain;

repeating said subtracting, converting and adjusting steps until said corrected error signal equals 0; and holding in said correction signal generating circuit said gain obtained when said corrected error signal equals 0.

7. A method for obtaining a tracking error signal and a focus error signal in an optical disk apparatus the steps comprising:

determining through disk sensing means whether said disk is housed or not;

carrying out the adjustment of a gain in a correction signal generating circuit, when it is determined that said disk is not housed;

discharging said disk by driving a disk tray through a disk tray driving means, when it is determined that said disk is housed;

housing said disk by driving said disk tray;

releasing servo signals upon reception in a photodetector of a reflected light from a disk; and subtracting a correction signal generated based on an adjusted gain from said servo signals in a subtracter, releasing the result of the subtraction as corrected servo signals, and converting said corrected servo signals into said tracking error signal and said focus error signal respectively thereafter.

* * * * *